Jan. 22, 1924.
A. G. SHELLER
NONSKID CHAIN
Filed Nov. 10, 1921
1,481,626
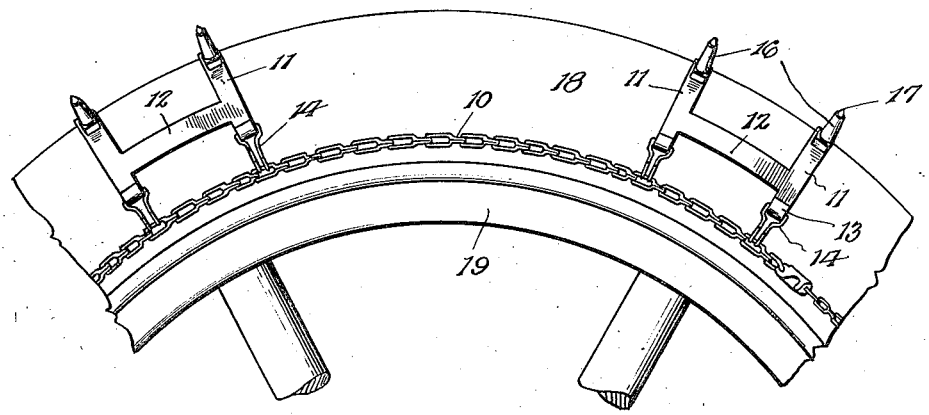
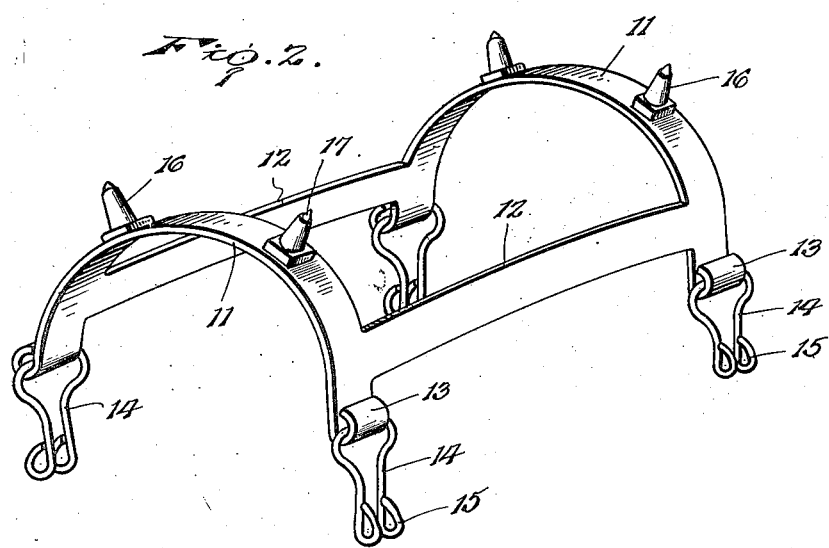
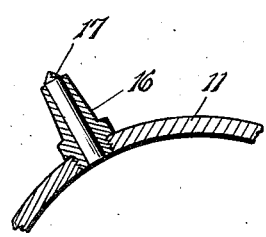
Inventor
A. G. Sheller.
By
Lacy & Lacy, Attorneys Patented Jan. 22, 1924.

1,481,626

UNITED STATES PATENT OFFICE.

ALBERT G. SHELLER, OF CLAYSVILLE, PENNSYLVANIA; ELLA S. SHELLER ADMINISTRATRIX OF SAID ALBERT G. SHELLER, DECEASED.

NONSKID CHAIN.

Application filed November 10, 1921. Serial No. 514,294.

*To all whom it may concern:*

Be it known that I, ALBERT G. SHELLER, citizen of the United States, residing at Claysville, in the county of Washington and State of Pennsylvania, have invented certain new and useful Improvements in Nonskid Chains, of which the following is a specification.

This invention relates to an improved non-skid chain for motor vehicles and has as one of its principal objects to provide a device of this character which will, when the vehicle is passing over slippery or icy roads, effectually prevent slipping.

The invention has as a further object to provide a non-skid chain wherein, when desired, calks may be applied for thus insuring a positive traction.

A still further object of the invention is to provide a device wherein the calks will be so constructed as to effectually resist wear.

And the invention has as a still further object to provide a device which may be readily employed in connection with motor vehicles of substantially any conventional design.

Other and incidental objects will appear hereinafter.

In the drawing:

Figure 1 is a fragmentary side elevation showing my improved non-skid chain applied to a motor vehicle wheel of conventional design, Figure 2 is an enlarged perspective view showing one of the saddle members employed, and Figure 3 is a fragmentary section particularly showing one of the calks.

In carrying the invention into effect, I employ side chains 10 which may be detachably connected at their ends in any approved manner and carried by the side chains is a plurality of saddle members, one of which is shown in detail in Figure 2. These saddle members are arranged at spaced points along the chains and any appropriate number of said members may be employed as may be found most efficient. As will be observed, each of said saddle members includes a pair of longitudinally bowed end plates 11 and extending between said plates near the ends thereof are side bars 12 which are preferably integral with the plates and rigidly support the plates in spaced relation. This construction provides an arrangement whereby each of the saddle members may be stamped from a piece of suitable resilient sheet metal and formed on the ends of the end plates 11 are loops 13. Extending through these loops are substantially U-shaped links 14 which may be formed of suitable resilient wire and the ends of said links are bent up to provide eyes 15 connecting the links with the side chains 10.

Detachably mounted upon the end plates 11 are pairs of spaced calks 16. As particularly shown in Figure 3, the calks are threaded at their lower ends through the end plates 11 and are formed with a shell in which is arranged a hard wear resisting core or pin 17 extending axially through the shell. As will be observed, the pins 17 project somewhat at the outer ends of the calks so as to engage a roadway while, adjacent their lower ends, the calk shells are provided with squared bosses or stop shoulders for receiving a wrench so that the calks may thus be readily applied.

In Figure 1 of the drawing, I have shown my improved non-skid chain in position about the tire 18 of a conventional motor vehicle wheel 19. It is believed that the manner in which the device is applied will be readily understood and the device will, of course, be constructed in various sizes to suit the requirements of different sized tires. As will be noted, the saddle members are formed to hug the tire and, without the calks 16 will, in most instances, provide sufficient traction for the wheel, the end plates 11 of said members providing, in effect, cross straps adapted to impinge the roadway to prevent skidding. However, as will be perceived, the calks 16 may, when icy or very slippery roadways are encountered, be readily applied and when so applied will, of course, sink into the roadway so as to provide a sure traction for the wheel. In this connection, it is to be noted that it is the intention to use the calks 16 only when found necessary and for this reason, the calks are detachably mounted upon the saddle members. As will be appreciated, the hard pins 17 of the calks will effectually resist wear while the projecting outer ends of said pins will enhance the effectiveness of the calks and, since the calks are so arranged as to be disposed at opposite sides of the crown of the tire, the calks will, of course, slope laterally in opposite directions with respect to the plane of the wheel for arresting any side slipping of the wheel in either direction. Further, by spacing the calks in the manner illustrated, the load upon the wheel will not come directly upon the calks while the effective tread portions of the end plates 11 will be unobstructed by the calks so that the calks will not produce any noticeable jolting of the wheel.

Having thus described the invention, what is claimed as new is:

In a non-skid chain, a plurality of unitary sheet metal saddle members each including a pair of spaced converging end plates bowed to fit the transverse curvature of a tire and joined by a pair of longitudinally curved side bars extending between the end portions of said plates, the ends of the plates being continued beyond the ends of said bars to form loops, links carried by said loops, a pair of spaced calks rising from each of said end plates near the ends of said side bars, and side members engaged by said links for supporting the saddle members on a tire.

In testimony whereof I affix my signature.

ALBERT G. SHELLER. [L. S.]